Nov. 15, 1949      J. H. BRODIE      2,488,050
AIRCRAFT LANDING SYSTEM
Filed Jan. 15, 1948      4 Sheets-Sheet 1
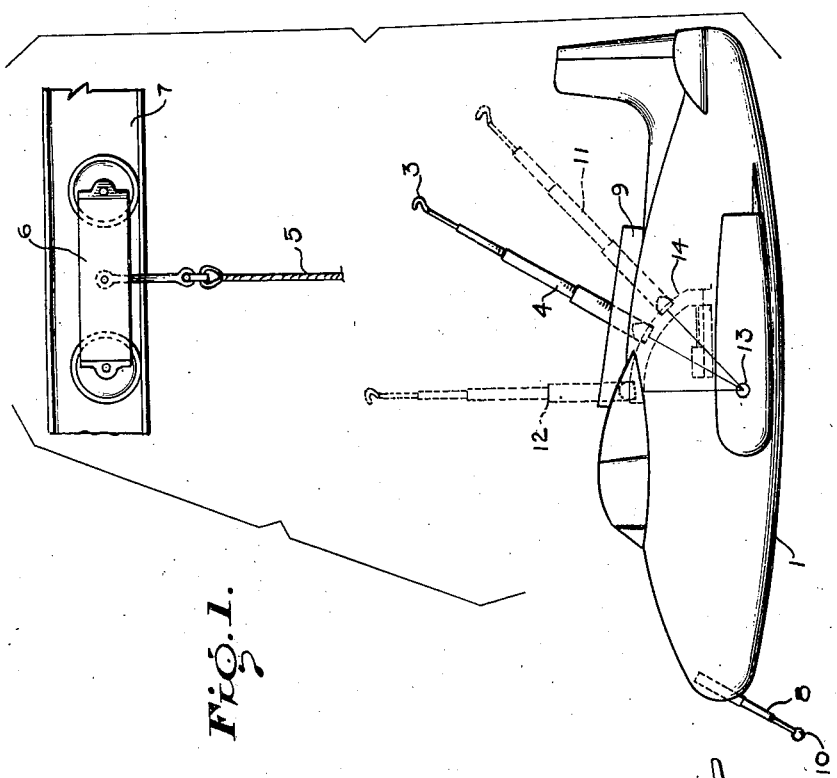
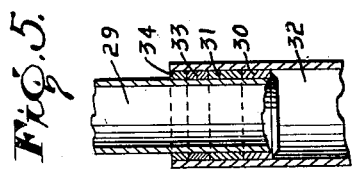
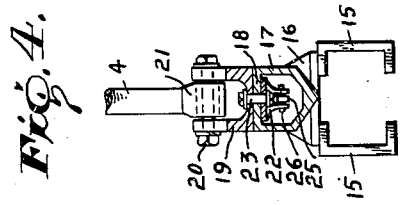
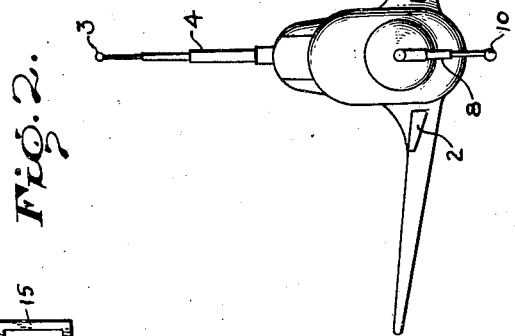
INVENTOR.
JAMES H. BRODIE.
BY
Cameron, Kerkam + Sutton
Attorneys

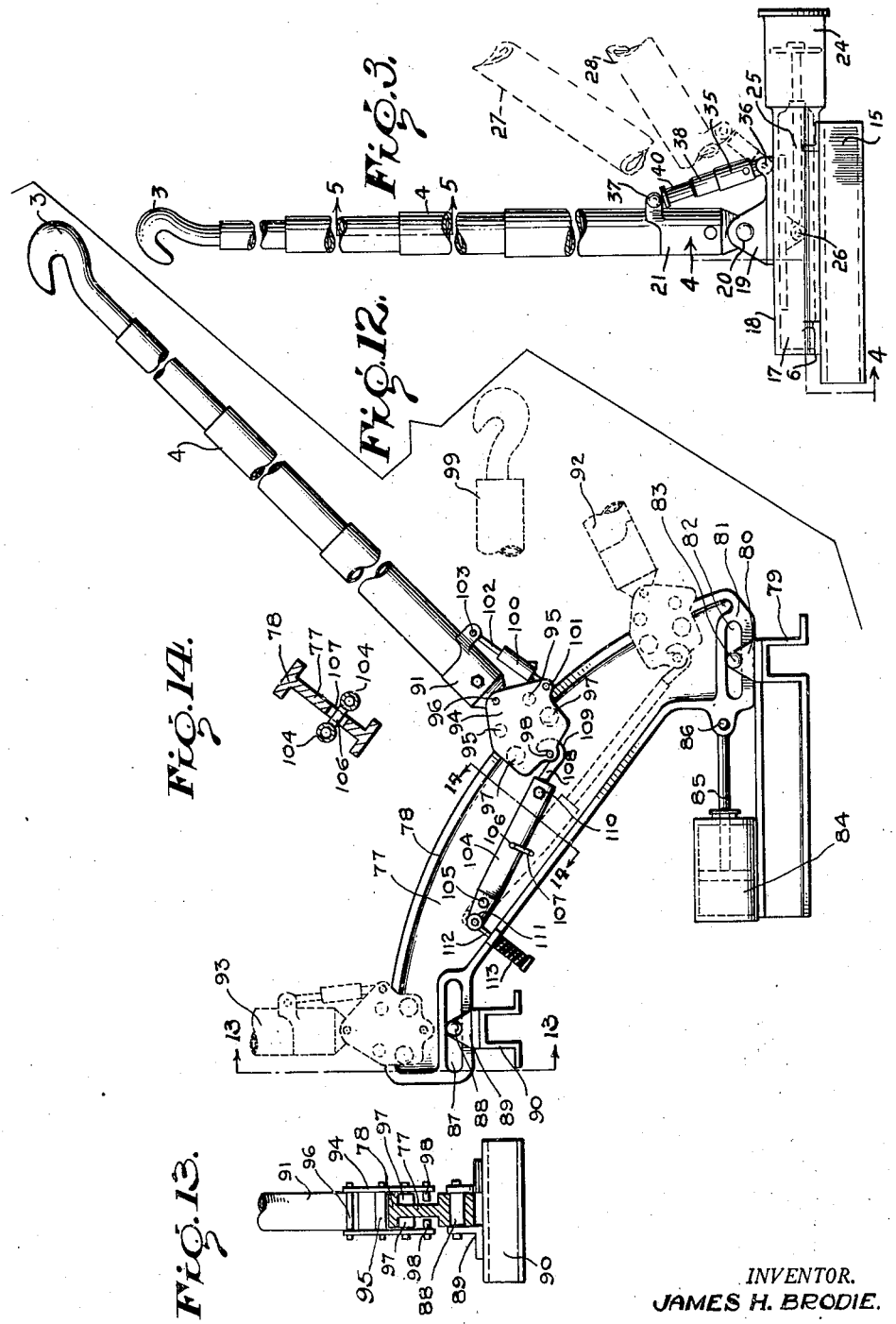

Nov. 15, 1949  J. H. BRODIE  2,488,050
AIRCRAFT LANDING SYSTEM
Filed Jan. 15, 1948  4 Sheets-Sheet 3
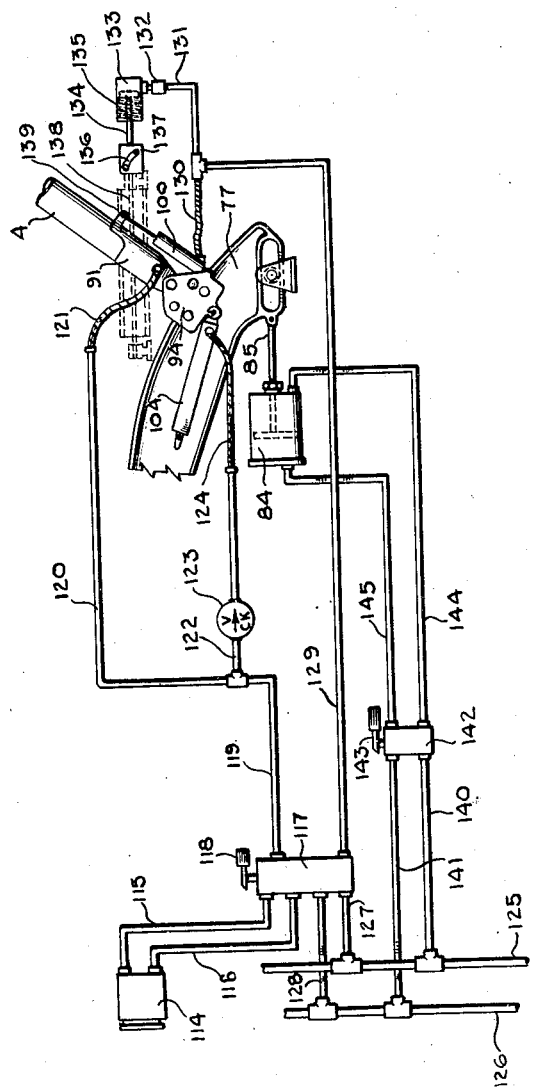
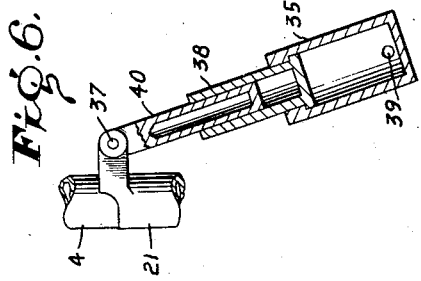
INVENTOR.
James H. Brodie
BY
Cameron, Kirkam + Sutton.
Attorneys

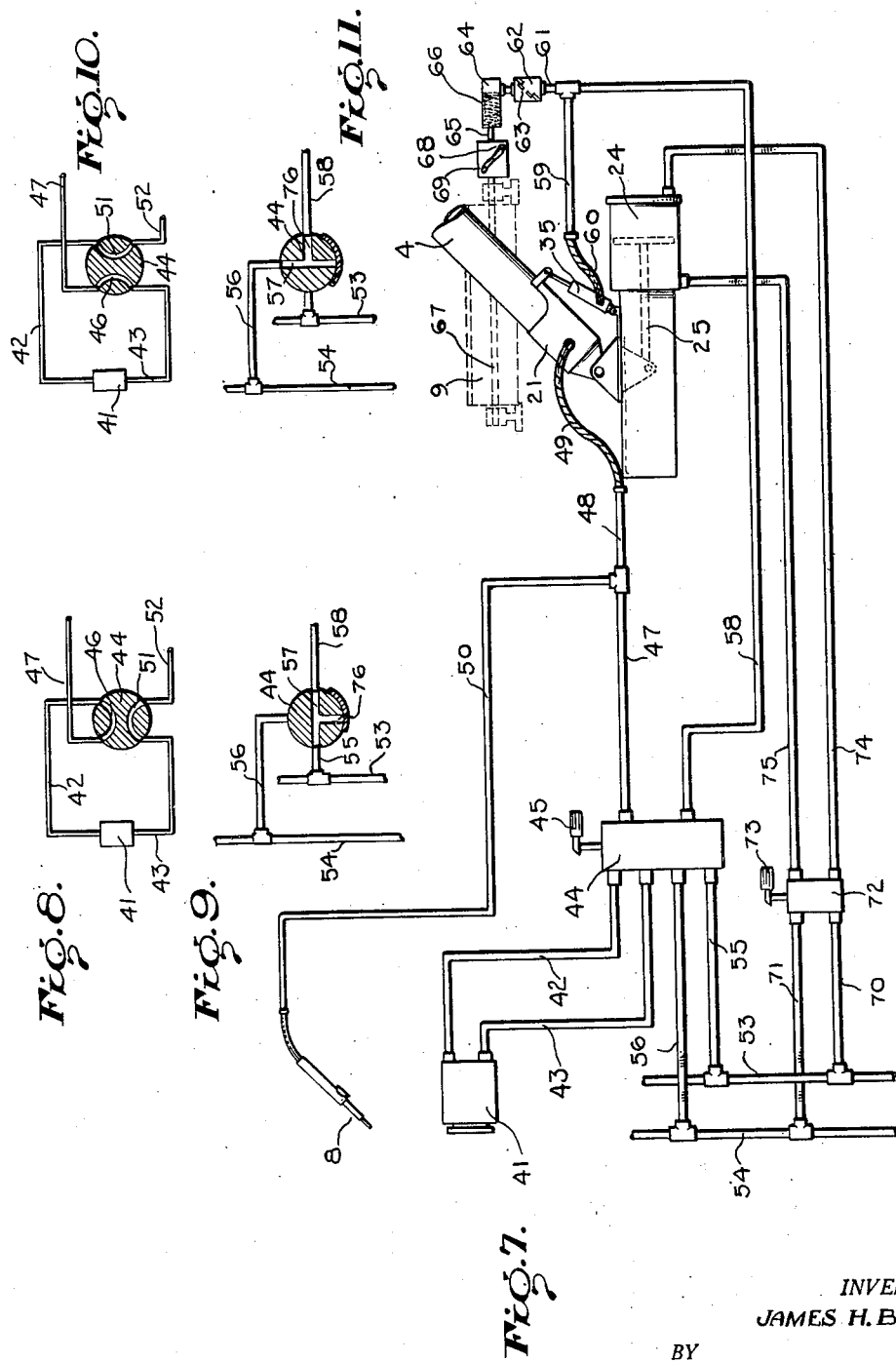

Patented Nov. 15, 1949

2,488,050

UNITED STATES PATENT OFFICE 2,488,050

AIRCRAFT LANDING SYSTEM

James H. Brodie, Baltimore, Md.

Application January 15, 1948, Serial No. 2,471

14 Claims. (Cl. 244—110)

This invention relates to the landing of aircraft without the use of any supporting undercarriage by means of suspension landing apparatus, and more particularly to the means on the aircraft itself whereby it is engaged with and suspended from such apparatus.

In many cases it is desired to land aircraft under conditions where conventional types of undercarriage cannot be used as in the case of difficult terrain, deep snow, on board ships not equipped with flight decks, etc. Also it is desirable in many cases to eliminate such conventional types of undercarriage entirely, especially in the case of jet propelled aircraft. Space and weight occupied by the usual landing gear are saved; the need for complex mechanisms, controls and structures used for supporting, extending and retracting the gear is eliminated; stresses are less, simplifying design problems; cleaner design is possible; thinner wing sections may be used; etc.

These factors point to wider use of suspension landing systems of types such as disclosed in my prior Patent No. 2,435,197, issued February 3, 1948 and in my copending application Serial No. 2,472, filed concurrently herewith. To adapt such systems to relatively heavy, high speed aircraft, however, various important factors must be taken into consideration with regard to the effects of landing loads on the aircraft itself and on the means employed on the aircraft to effect its suspension from the landing apparatus.

A main problem is to transmit applied landing loads to the aircraft in a line which always passes through or nearly through the center of gravity of the aircraft. Otherwise there may be force couples tending to nose the aircraft up or down that are too strong to be compensated by flight controls so that the aircraft may be thrown into awkward attitudes during the deceleration run, while it has no means for righting itself to a level position when stopped. Also the suspending gear and in particular the hook which engages the landing apparatus should be capable of swinging in a vertical plane parallel to the center line of the airplane, while maintaining the line of applied force always through the center of gravity of the airplane. The hook should be supported in an inclined position for proper engagement with the landing apparatus, but should be capable of swinging rearwardly relatively to the airplane from such inclined position as the suspending trolley is accelerated in order to avoid excessive stress caused by impact and acceleration forces. Moreover when the airplane is brought to a stop the hook should swing back past the inclined position to a vertical position.

The problem of maintaining the line of force through the center of gravity in all such positions of the hook is complicated by the fact that the center of gravity of the airplane shifts from time to time as the weight or distribution of the cargo carried by the plane varies, as fuel is expanded, etc.

Still further the entire suspension gear on the airplane must be operable automatically, including full extendability and retractability, by simple, reliable means under the control of the pilot.

The drawings show two embodiments of the invention which accomplish the above objects and results, but it is to be understood that said drawings are for purposes of illustration only and are not to be taken as a definition of the limits of the invention, reference being had to the appended claims for this purpose.

In the drawings:

Fig. 1 is a somewhat diagrammatic side view of an airplane equipped with one form of suspension means embodying the invention;

Fig. 2 is an end view of the airplane shown in Fig. 1;

Fig. 3 shows one form of suspension means embodying the invention;

Fig. 4 is a side view of Fig. 3 on the line 4—4;

Fig. 5 is a section on the line 5—5 of Fig. 3;

Fig. 6 is a detail of a mast erection cylinder;

Fig. 7 shows diagrammatically a fluid pressure system for operating the apparatus;

Figs. 8-11 are diagrams showing the positions of the control valve;

Fig. 12 shows another form of suspension means embodying the invention;

Fig. 13 is a side view of Fig. 12 on the line 13—13;

Fig. 14 is a section on the line 14—14 of Fig. 13; and

Fig. 15 shows diagrammatically a fluid pressure system for operating the apparatus of Figs. 12-15.

Figs. 1 and 2 show diagrammatically and by way of example an airplane 1 of the jet propelled type with twin jets the air intakes of which are indicated at 2. A landing hook 3 is carried by an extensible and retractible mast 4 as described in detail hereinafter, the full line position of these parts in Fig. 1 being that occupied as the airplane approaches the landing apparatus which may suitably be of the type disclosed in one of my aforesaid applications. As indicated diagrammatically in Fig. 1, such landing apparatus may comprise a suitable sling 5 adapted to be engaged by the hook 3, said sling depending from a suitable trolley 6 running on an elevated runway 7. As the airplane reaches the sling, the inclined mast 4 serves to guide the sling into the hook whereby the airplane becomes suspended from the trolley during its deceleration run as will be understood from my prior applications mentioned above. In some cases, and particularly in the case of airplanes having comparatively long nose sections, it may also be desirable to provide an extensible guide mast 8 at the nose of the airplane so that in the event the airplane approaches the sling in a nose-high attitude, the sling will not be fouled but will engage the guide mast and be guided up over the nose and to the mast 4.

It will be understood that the hook 3, mast 4, and guide mast 8 are fully retractible as described in detail hereinafter. The mast 4 is preferably shortened and laid back with its hook 3 into the fuselage through a narrow elongated opening therein which opening may be closed by a hinged door 9 or the like. A similar arrangement can be used with the guide mast 8 if desired, but since this mast needs only to be extended and retracted in a straight line, a small circular opening in the fuselage is all that is required and such an opening can be closed most conveniently by a plate 10 or the like carried on the end of the guide mast itself.

When the hook 3 engages the sling 5, the trolley 6 must be accelerated and to avoid excessive stress due to impact and acceleration forces, the mast should be held resiliently in the approach position shown in full lines in Fig. 1 and should be capable of swinging back to the dotted line position 11 which it occupies during the deceleration run on the runway 7. Also after the trolley and suspended airplane have been brought to a stop, the mast should be capable of swinging back past the approach position to the dotted line vertical position 12 shown in Fig. 1.

In all three of these positions of the mast, its center line in which forces are transmitted and applied to the airplane should pass through the center of gravity of the airplane which is indicated at 13. When the foot of the mast can be located within the fuselage at or near the center of gravity of the airplane, the foot itself can be pivoted on a transverse axis through this point. In other cases, however, such an arrangement is not feasible because of structural considerations such as the location of the engine. In this event the foot of the mast may be supported slidably in an arcuate support such as indicated diagrammatically at 14 in Fig. 1, said support being arranged so that the foot of the mast travels in an approximate circle around the approximate center of gravity 13 of the airplane with the mast in a substantially radial position as shown at 4, 11 and 12. In both types of mountings, therefore, the mast has pivotal movement about the approximate center of gravity as a center, the mast swinging about this center in a vertical plane parallel to the center line of the airplane.

However, the center of gravity of the plane may shift as noted above. Although such shifts are small in actual amount, nevertheless even small displacements of the center of gravity either forward or aft with respect to the line of application of force (i. e., the center line of the mast) are objectionable because of the relatively large forces acting in the resulting force couple. Hence in either type of mounting, the foot of the mast is mounted in a mast support which is movable relative to the plane to compensate for shift of the center of gravity. In most cases only fore and aft shifting of the center of gravity needs to be compensated. By moving the support in a horizontal line either fore or aft as the case may be, the pilot is able to shift the line of application of force either fore or aft sufficiently to cause it to pass nearly through the actual center of gravity of the airplane at the moment of landing. Thus undesirable force couples are minimized if not eliminated, and also the suspended plane maintains a level position or can be righted to a level position after it has been brought to a stop.

Figs. 3–16 illustrate the above two types of suspension means in greater detail. Reference will be made first to Figs. 3-6 showing a suitable form of construction of suspension means of the first type wherein the foot of the mast 4 is pivoted on a transverse axis passing nearly through the center of gravity of the airplane as described above, the foot of the mast being also mounted for horizontal fore and aft movement to compensate for shift of the center of gravity.

Any suitable fixed structural part of the airplane can be used as a fixed support to which the foot of the mast is connected and along which it is movable. As shown, this fixed support is represented by two parallel longitudinal channels 15 joined together at the top by feet 16 carrying a chassis 17 the flat top 18 of which provides a fixed horizontal surface. A mast carriage 19 is movable along the surface 18 in a fore and aft direction, said carriage having spaced lugs carrying a pivot pin 20 on which the mast socket 21 is pivoted. It will be understood that the horizontal plane through the axis of the pin 20 passes nearly through the center of gravity of the airplane as indicated at 13 in Fig. 1.

The carriage 19 is suitably connected to the support 17 to withstand the upward pull of the mast 4 when the airplane is suspended. As shown, a plate 22 slidably engages the under surface of the top 18 of the chassis and is connected to the carriage 19 by means of a bolt 23 working in a slot in the top 18. Suitable fluid pressure means are provided to shift the carriage longitudinally on the chassis, such means being here shown as a fluid pressure cylinder 24 formed integrally with the chassis 17 at one end, the piston rod 25 of this cylinder extending into the chassis and being pivotally connected to lugs 26 depending from the plate 22. It will be understood that any suitable type of antifriction bearing can be used between the plate 22 and the chassis top 18.

Fig. 3 shows the mast 4 in full lines in the vertical position corresponding to 12 in Fig. 1, the suspended airplane having been brought to a stop. The inclined contact position of the mast as it approaches the landing apparatus is also indicated in dotted lines at 27, this position corresponding to the full line position of Fig. 1. The position 11 during deceleration (Fig. 1) is indicated in dotted lines at 28 in Fig. 3. The mast swings on its pivot pin 20 between these positions, working through the open door 9 shown in Fig. 1.

The mast itself comprises a plurality of telescoping sections extendable and retractible by fluid pressure, and when it is laid back in the position 28 and also fully retracted, the hook 3 is withdrawn inside the fuselage so that the door 9 can be closed. Fig. 5 shows in detail a suitable sliding connection between two telescoping sections of the mast. The lower end of the inner section 29 carries a stop collar 30 rigidly secured thereto as by welding and engaging a similar collar 31 rigidly secured inside the outer section 32 near its upper end, thus limiting the extension of the sections. A tight sliding joint is obtained by packing 33 interposed between the collar 31 and another collar 34 secured to the section 32, this packing engaging the outer surface of the section 29. The lower section of the mast is secured in the mast socket 21 mentioned above, and the upper section of the mast carries the hook 3.

When the aircraft prepares to land, the mast is not only extended by internal fluid pressure but also swung on its pivot 20 and erected to the contact position 27. This is accomplished by a fluid pressure erection cylinder 35 having one end pivoted at 36 on the mast carriage 19 and its other end pivotally connected at 37 to a lug on the mast socket 21. The details of a suitable form of erection cylinder are shown in Fig. 6. A piston 38 slides in the cylinder 35, being forced out to the limiting position shown in Fig. 6 by fluid pressure admitted to the cylinder through the inlet port 39. The piston 38 is also bored to receive a piston rod 40 which can be pulled out of the piston 38 as shown in Fig. 6 independently of fluid pressure in the cylinder 35.

With the erection system 35, 38, 40 fully contracted as shown in dotted lines in Fig. 3, fluid pressure is admitted through port 39 and the piston 38 is moved outwardly to swing the mast to the desired contact position 27. After the hook engages the sling, the mast may swing back toward or to the position 28 under the acceleration and deceleration forces set up as described above, this movement being yieldingly resisted by the fluid pressure in back of the piston 38. As the airplane is brought to a stop, the mast tends naturally to swing to the vertical position, which it is free to assume independently of the fluid pressure system by pulling the rod 40 out of the piston 38.

The opening of the door 9, the extension and erection of the mast 4, and the extension of the guide mast 8 (when used) are all performed automatically following the operation by the pilot of a common fluid pressure control. A suitable pneumatic system for this purpose is shown in Fig. 7. An air compressor 41 is connected by a pressure line 42 and suction line 43 with a control valve unit 44 operated by a handle 45. The starting position of the valve unit is shown diagrammatically in Fig. 8. The pressure line 42 is connected through valve passage 46 with a pressure line 47 one branch 48 of which leads through a flexible hose 49 to the mast 4 and another branch 50 of which leads to the guide mast 8. The suction line 43 is connected through a valve passage 51 to an air intake 52. The guide mast 8, like the mast 4, comprises a plurality of telescoping sections so that both of these masts are thus extended by internal pressure. The rate of flow of compressed air to the mast 4 is controlled by proportioning the size of the passages so that this mast is not extended faster than the door 9 can be opened as described hereinafter.

The operation of the door opening mechanism and of the mast erection system is preferably hydraulic, but controlled by the same valve unit 44 and handle 45. The hydraulic pressure is obtained from the hydraulic system of the airplane, a pressure line thereof being indicated at 53 and a return line at 54. These lines are connected at 55 and 56 respectively with the lower half of the valve unit 44, the starting position of which is shown diagrammatically in Fig. 9. The pressure fluid passes through a valve passage 57 to a line 58 one branch 59 of which is connected through a flexible hose 60 with the inlet opening 39 of the erection cylinder 35. The size of this opening is proportioned so that the mast will not be erected to contact position before the door 9 is opened.

A second branch 61 of the pressure line 58 leads to a check valve 62 arranged to open to permit free flow in the direction of fluid pressure, and also having an orifice 63 which permits restricted flow in the return direction. From this check valve, the pressure fluid enters a cylinder 64 and forces its piston rod 65 outwardly against a spring 66. The door shaft 67 carries a radial pin 68 engaging in a cam slot 69 carried by the piston rod, so that outward movement of the piston rod in response to fluid pressure swings the door to open position.

Accordingly when the aircraft prepares to land, the pilot merely turns the control handle 45 from neutral to landing position, thus admitting compressed air to the line 47 and hydraulic pressure liquid to the line 58. The door 9 immediately starts to open and moves quickly to fully open position. Meanwhile the hydraulic pressure liquid operates the erection system to swing the mast to contact position, while compressed air extends the mast, but these operations are retarded somewhat by metering the pressure fluids to permit the door to reach fully open position.

If necessary, the pilot now adjusts the position of the mast carriage 19 to compensate for shift in the center of gravity of the airplane. The pressure cylinder 24 can conveniently be operated hydraulically, and as shown the hydraulic pressure and return lines 53 and 54 are connected at 70 and 71, respectively, with a second valve unit 72 operated by a handle 73. This valve unit is similar in operation to that shown in Figs. 8 and 10. With the handle 73 in one opsition, a valve passage corresponding to 51 (or 46) conducts pressure liquid from the line 70 to a line 74 leading to one end of the cylinder 24, while the other end of the cylinder is connected by a line 75 and through a valve passage corresponding to 46 (or 51) with the return line 71. Thus the mast carriage is moved to the left as seen in Fig. 7 until the valve handle 73 is returned to neutral position. When the valve handle 73 is moved in the other direction the line 74 is connected with the return line 71 while the line 75 is connected with the pressure line 70 (compare Fig. 10) so that the direction of movement of the mast carriage is reversed.

When the airplane is brought to a stop and then removed from the landing apparatus, the pilot turns the control handle 45 back past neutral and in the opposite direction, shifting the position of the valve unit 44 from that illustrated by Figs. 8 and 9 to that illustrated by Figs. 10 and 11. As shown in Fig. 10, the line 47 to the mast 4 (and to the guide mast 8 when used) is now connected through valve passage 46 to the suction line 43 of the air compressor which now discharges through line 42 and valve passage 51 to the air outlet 52. The consequent suction rapidly retracts the mast or masts.

Meanwhile (see Fig. 11) the hydraulic liquid line 58 is connected by valve passages 76 and 57 to the hydraulic return line 56, 54. The erection system is thus collapsed as the mast is retracted to its housed position within the fuselage, while the door is closed by the action of the return spring 66 but more slowly by virtue of the restricted orifice 63 so that the mast is fully retracted within the fuselage before the door is closed.

Figs. 12–15 show a form of construction of suspension means of the second type mentioned above and illustrated diagrammatically in Fig. 1. As previously explained, this second form is adapted for the case where the foot of the mast cannot be pivoted at the center of gravity 13 for structural or other reasons.

In such cases an arc-shaped mast support is employed such as shown generally at 14 in Fig. 1, the arc being centered at the center of gravity and the entire support being mounted for horizontal fore and aft movement to compensate for shift of the center of gravity. In the form shown, the support comprises a beam 77 which is I-shaped in cross section, the outer flange 78 being curved in the arc of a circle about the center of gravity. The beam 77 is located in a fore and aft plane and is mounted at its two ends for horizontal fore and aft movement. For example, transverse structural members 79 of the airplane carry brackets 80 between which slides the lower end 81 of the beam, this lower end being preferably slotted horizontally at 82 to receive a roller 83 extending between the brackets 80. Longitudinal airplane structure carries a pressure cylinder 84, preferably hydraulic like the cylinder 24, the piston rod 85 of this cylinder being pinned at 86 to the lower end 81 of the arc beam. The upper end of the arc beam is provided with a similar horizontal slot 87 through which passes a roller 88 mounted in brackets 89 that are carried by transverse structural members 90. Operation of the cylinder 84 thus moves the arc beam in a horizontal fore and aft direction on the rollers 83 and 88.

The mast 4 is extensible and retractible in the same manner as described above, the mast comprising telescoping sections the lowermost of which is secured in the mast socket 91. Fig. 12 shows the mast in full lines in the contact position, the deceleration position being indicated in dotted lines at 92 and the vertical position in dotted lines at 93. The mast moves between these positions by means of a mast carriage running on the circular flange 78 of the arc beam and carrying the mast socket 91.

In the form shown, the mast carriage comprises spaced parallel side plates 94, one on either side of the arc beam, these plates being interconnected by suitable means which include a pair of rollers 95 running on the outer surface of the flange 78 and also a pin 96 to which the mast socket 91 is connected. Underneath the flange 78, each side plate 94 carries a pair of rollers 97 adapted to engage the under surface of the beam flange when the airplane is suspended. Each side plate 94 also carries a locating pin 98 for a purpose described hereinafter.

In this embodiment erection of the mast to contact position comprises not the swinging of the mast on its pivot as in the previous embodiment, but instead the equivalent operation of moving the mast carriage 94 to an intermediate position on the arc beam as shown in full lines. Moreover, since the arc is located near the outer line of the fuselage, it is not feasible in some cases to withdraw the mast and hook entirely within the fuselage by simply retracting the mast in the position 92. Under these circumstances the mast carriage may be held normally in the intermediate full line position shown in Fig. 12, with provision for yield to permit the carriage and mast to move toward or to the dotted line position 92 after engagement with the landing apparatus.

Also the mast is pivoted on the pin 96 so that when retracted the mast and hook can be swung back and down on the pin to the position indicated in dotted lines at 99 where they are within the fuselage. The erection cylinder 100, therefore, needs only to swing the mast on its pivot pin from the horizontal position 99 to the radial position shown in full lines. One end of this cylinder is pivoted at 101 on the mast carriage 94, while the end of the piston rod 102 is pivoted at 103 on the mast socket 91. The cylinder and piston may be like the cylinder 35 and piston 38 of the previous embodiment, but no provision need be made for additional extension corresponding to that of the piston rod 40 of the previous embodiment.

Pneumatic means are preferably employed for holding the mast carriage 94 in its normal position but permitting yield toward its dotted line deceleration position 92, such means also permitting free movement of the mast carriage to the vertical position 93 at the top of the arc when the airplane is brought to a stop. In the form shown, a pair of pneumatic cylinders 104 are located one on each side of the arc member 77, these cylinders having a common pivot axis 105 at one end and swinging in unison about this axis by virtue of a connecting link 106 working in a slot 107 of the arc beam. The piston rods 108 of these cylinders carry hooks 109 adapted to engage the locating pins 98 on the mast carriage.

When the piston rods are retracted by air pressure admitted to the cylinders at 110, the mast carriage is held in its normal position but is capable of moving toward the dotted line position 92 by pulling out the piston rods against the yielding air cushions in the cylinders. When the airplane is brought to a stop, however, the carriage can move freely up the arc to the dotted line position 93, the hooks 109 constituting only a one-way holding connection. Meanwhile the hooks are retracted and also held up close to the flange 78 in the path of the pins 98 by means of cylinder extensions 111 and bolts 112 provided with springs 113.

The operation of this system is effected by a combined pneumatic and hydraulic system similar to that of the previous embodiment and shown diagrammatically in Fig. 15. An air compressor 114 is connected by a pressure line 115 and a suction line 116 with a valve unit 117 operated by a handle 118. The operation of the pneumatic valve unit may be the same as that shown in Figs. 8 and 10. In landing position, the pressure line 115 is connected through the valve to a line 119 one branch 120 of which leads through a flexible hose 121 to the mast socket 91 to extend the mast. A second branch 122 leads through a check valve 123 and flexible hoses 124 to the cylinders 104.

Hydraulic pressure and return lines 125 and 126 are connected at 127 and 128 with the hydraulic part of the valve unit 117, the operation of which may be the same as that shown in Figs. 9 and 11. In landing position, the pressure line 127 is connected through the valve to a line 129 one branch of which leads through a flexible hose 130 to the erection cylinder 100. A second branch 131 leads to a door operating mechanism like that previously described and comprising a check valve 132, cylinder 133, piston rod 134 and return spring 135, door cam 136 and pin 137, door shaft 138 and door 139. Thus the mast carriage 94 is properly positioned on the arc and held there pneumatically and the door is opened and the mast erected and extended. Timing in these operations can be provided as required by proportioning the flow passages.

The cylinder 84 is then operated to adjust the position of the mast with respect to the center of gravity of the airplane by hydraulic means as described in the previous embodiment. The hydraulic lines 125 and 126 are connected by lines 140 and 141 to a valve unit 142 operated by a handle 143 and similar to the valve unit 72, 73. The operation of the cylinder 85 is effected by the hydraulic lines 144 and 145 leading from the valve unit 142 to opposite ends of the cylinder.

When the airplane engages the landing apparatus, the carriage 94 moves down the arc toward its position 92, this being accompanied by further compression of the air in the cylinders 104 which is held by the check valve 123. This action serves to cushion the carriage 94 and prevent striking contact as the carriage approaches the end of its travel on the beam 77. As the airplane comes to a stop, the carriage moves back toward normal position as the applied load through the mast 4 takes components perpendicular to tangents higher on the arc. At the same time the expanding air in the cylinders 104 returns the hooks 109 to normal position. The mast is free to run up to the vertical position at the top of the beam 77.

When the handle 118 is moved to the opposite position, suction is applied to the line 120 to retract the mast, but pressure is retained in the cylinders 104 by the check valve 123. The mast carriage runs down the arc by its own weight until it is caught by the hooks 109. Also the retracted mast is swung on its pivot pin 96 to the position 99 by collapse of the erection cylinder 100 which is connected to the hydraulic return line. Meanwhile the door 139 is closed by suction, but gradually by reason of the check valve 132. Thus all parts are returned to normal position.

It will be understood that the invention is not restricted to the embodiments described above, but is susceptible of other embodiments and of various changes in the form, details of construction and arrangement of the parts, many of which will now occur to those skilled in the art. Hence reference should be had to the appended claims for a definition of the limits of the invention.

What is claimed is:

1. An airplane having suspension means for landing comprising a suspension mast, a mast support movably mounted in said airplane, said mast being mounted on said support to swing in a vertical longitudinal plane parallel to the center line of the airplane about a transverse axis passing substantially through the center of gravity of the airplane, and means operable by the pilot for moving said support to compensate for shift of said center of gravity.

2. An airplane having suspension means for landing comprising a suspension mast, a mast support movably mounted in said airplane, said mast being mounted on said support to swing in a vertical longitudinal plane parallel to the center line of the airplane about a transverse axis passing substantially through the center of gravity of the airplane, and hydraulically-operable means under the control of the pilot for moving said support to compensate for shift of said center of gravity.

3. An airplane having suspension means for landing comprising a suspension mast, a mast support mounted in said airplane for movement in a horizontal fore and aft direction, means on the support for mounting said mast to swing about an axis transverse to the center line of the airplane, said axis passing substantially through the center of gravity of the airplane, and means operable by the pilot for moving said support to compensate for shift of said center of gravity.

4. Apparatus as defined in claim 3 wherein said means for moving said support comprises a hydraulic piston operable by the pilot.

5. An airplane having suspension means for landing comprising a suspension mast, a mast support having means mounting the mast thereon to swing about an axis transverse to the center line of the airplane and passing substantially through its center of gravity, a fixed support extending horizontally in a fore and aft direction, means connecting said mast support to said fixed support to suspend the airplane and for movement longitudinally on said fixed support, and means operable by the pilot for moving said mast support on said fixed support to compensate for shift of the center of gravity of the airplane.

6. Apparatus as defined in claim 5, said means mounting the mast on the mast support comprising an arc member mounted on said mast support in a fore and aft plane and centered on said axis, and a mast carriage holding the foot of the mast and movable along said arc member about said center.

7. Apparatus as defined in claim 6, said mast carriage having radially spaced rollers engaging inner and outer concentric surfaces of said arc member.

8. An airplane having suspension means comprising a suspension mast, a mast support having means mounting the mast thereon to swing about an axis transverse to the center line of the airplane and passing substantially through its center of gravity, said mast comprising telescoping sections extendable by internal fluid pressure, the extended mast occupying a rearwardly inclined contact position preparatory to landing and being capable of swinging rearwardly therefrom during deceleration of the airplane and forwardly therefrom to a substantially vertical position when the airplane is brought to a stop, means for swinging said mast to said contact position comprising a cylinder extendable by fluid pressure and connected to said mast intermediate its ends, a guide mast comprising telescoping sections extendable by internal fluid pressure to project from the nose of the airplane, and fluid pressure control means operable by the pilot to supply fluid pressure to and to extend said masts and cylinder.

9. Apparatus as defined in claim 8, said fluid pressure control means being reversible to apply suction to said masts and cylinder to retract said guide mast and to retract and lower said suspension mast.

10. An airplane having suspension means for landing comprising a suspension mast, an arc-shaped mast support lying in a fore and aft plane and centered on an axis which is transverse to the center line of the airplane and passing substantially through its center of gravity, a mast carriage holding the foot of the mast and movable along said arc-shaped support, yieldable means normally holding said carriage at an intermediate point on said arc at which said mast occupies a rearwardly inclined radial contact position preparatory to landing, said means yielding and said carriage moving rearwardly on said arc during deceleration of the airplane, the connection of said means to said carriage being releasable for free movement of said carriage in a forward direction on said arc.

11. Apparatus as defined in claim 10, said yieldable means comprising a fluid pressure cylinder and piston having a hook connection to said carriage to hold it against rearward movement on said arc and release it for forward movement on said arc, and fluid pressure control means operable by the pilot and connected to said cylinder to retract said piston therein and hold said carriage at its intermediate position, said piston being yieldable rearwardly against said fluid pressure.

12. Apparatus as defined in claim 11, said cylinder being pivotally mounted at its end on said arc shaped support, and resilient means tending to swing said cylinder on its pivot in a direction to maintain the releasable hook connection in the path of said carriage.

13. Apparatus as defined in claim 10, said mast comprising telescoping sections extendable by fluid pressure and retractable by suction, said yieldable means comprising a fluid pressure cylinder, and fluid pressure control means operable by the pilot and connected to said mast and cylinder.

14. Apparatus as defined in claim 13, the foot of said mast being pivoted on said carriage so that the retracted mast can be lowered, and means comprising a fluid pressure cylinder connected to said fluid pressure control means for swinging said mast about its carriage pivot between its lowered position and a position that is radial with respect to said transverse axis.

JAMES H. BRODIE.

REFERENCES CITED

The following references are of record in the file of this patent:

UNITED STATES PATENTS

| Number | Name | Date |
|---|---|---|
| 1,735,385 | Fisher | Nov. 12, 1929 |
| 1,738,261 | Perkins | Dec. 3, 1929 |